June 13, 1967 — S. M. NIEMIEC — 3,324,603
GRINDING TOOL WITH INTERRUPTED HELICOID
Filed Aug. 13, 1964 — 2 Sheets-Sheet 1
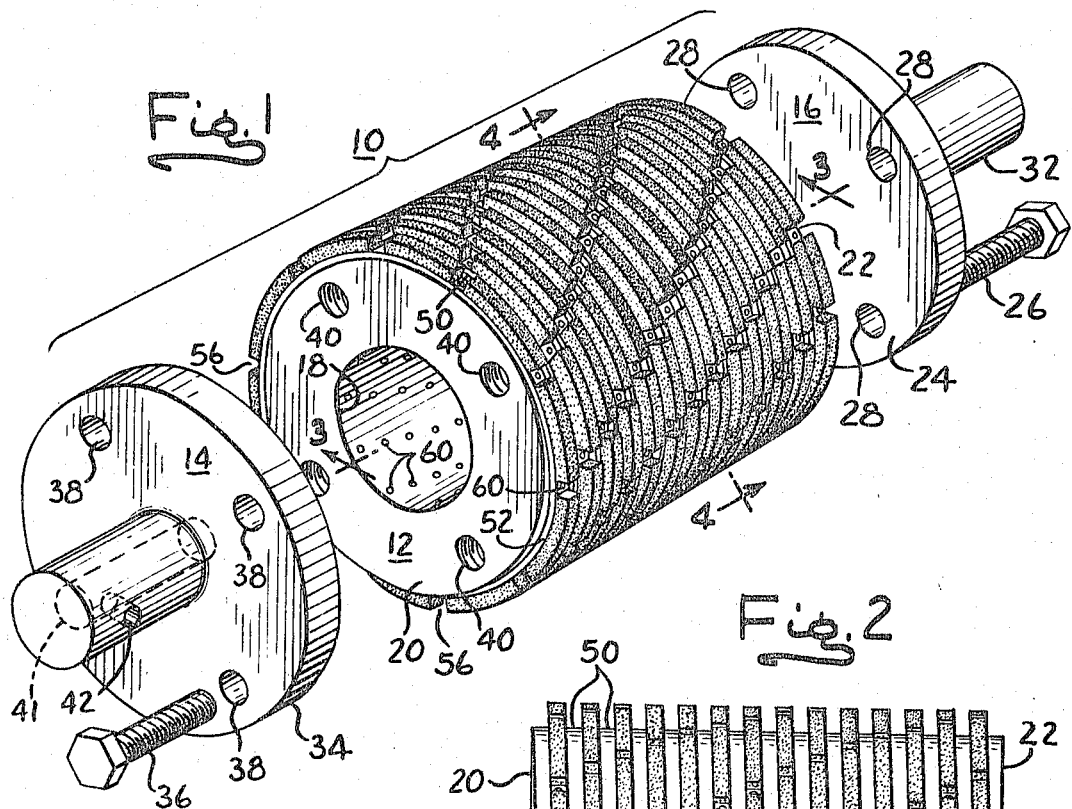
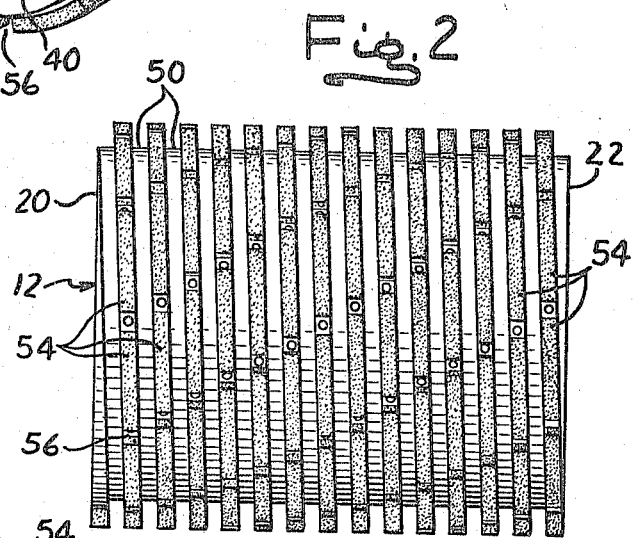
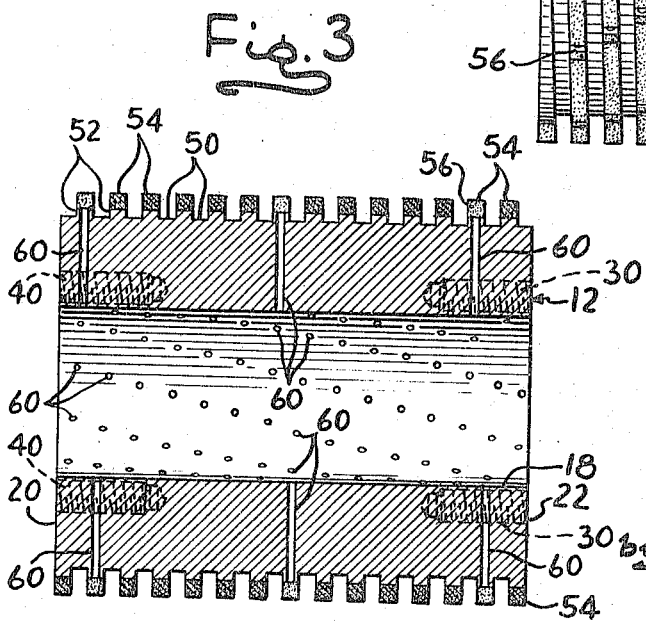
INVENTOR
STEPHEN M. NIEMIEC
by: Norman Gerlach
ATTY.

INVENTOR
STEPHEN M. NIEMIEC

3,324,603
GRINDING TOOL WITH INTERRUPTED HELICOID
Stephen M. Niemiec, Chicago, Ill., assignor to Super-Cut, Inc., Chicago, Ill., a corporation of Illinois
Filed Aug. 13, 1964, Ser. No. 389,320
1 Claim. (Cl. 51—206.4)

The present invention relates to a grinding tool for surfacing refractory materials such as concrete, marble, granite and the like and has particular reference to a generally cylindrical rotary tool having an interrupted abrasive helicoid, the tool being adapted for use in a grinding machine whereby relative traversing motion between the tool and the work undergoing surfacing may be effected. The grinding tool of the present invention is adaptable for use in connection with a wide variety of commercially available grinding machines, whether they be of the type wherein the grinding head is caused repeatedly to traverse the work or whether the reverse is the case. The present grinding tool is also useful in connection with tractionally-driven or tractor-drawn vehicle type grinding machines as are commonly employed for surfacing concrete roadways, aircraft landing fields and other areaways or the like. Irrespective, however, of the particular use to which the present grinding tool may be put, the essential features thereof are at all times preserved.

In the construction of grinding and cutting tools, especially rotary segmental stone cutting saws, it has long been the practice to employ for cutting purposes a series of peripheral, circumferentially spaced segments in the form of metallic matrices with crushed or fragmented diamond particles distributed throughout the same. These segments are applied to the periphery of the grinding wheel body by a soldering, brazing or other similar operation involving the application of heat. Spacing of the segments in a circular row or rows is resorted to in order to attain better cutting action, especially when a liquid coolant is employed, the spaces between adjacent segments affording sludge collection pockets and greatly enhancing the flushing action during the grinding or cutting operation.

Whether the grinding tool be a comparatively wide grinding wheel or a narrow saw blade, application of the abrasive segments to the tool body is an arduous task and requires careful positioning of the segments, one by one, on the periphery of the tool, followed by immediate soldering or brazing thereof in position. The abrasive segments are in the form of elongated hexahedrons which are rectangular in cross section, usually square, and proper circumferential spacing thereof on the tool body in end-to-end relationship is readily accomplished by the simple expedient of taking measurements, usually requiring only the positioning of one end of a temporary spacer against the end of a previously applied segment so that the next segment may be placed against the other end of the spacer and the proper distance attained. Longitudinal spacing of the segments on a cylindrical tool body is, however, extremely difficult since it is hampered by the presence of adjacent closely spaced segments which impede manual operations, such as the application of the solder or brazing materials and the application of the soldering torch, electrode or other heat applying tool.

The present invention contemplates the provision of a comparatively wide segmental grinding tool including a cylindrical tool body having spaced abrasive segments mounted on the generally cylindrical surface thereof, the segments being arranged in a continuous helical row of short pitch, the axes of the elongated segments extending in the direction of the helix wind or path, and the pitch being sufficiently short that, despite the elongation of the segments, several successive segments will sweep over a given fixed point on a surface undergoing grinding before a given helix thread will shift laterally from the point. The rotating tool is designed for traverse fore-and-aft, as distinguished from endwise movement and, thus during any given traverse operation in either direction, all points on the surface of the slab or other work undergoing grinding are operated upon in abrasive overlap fashion so that a continuously smooth surface will result. The grinding tool of the present invention is thus essentially a finish grinding tool.

It will be appreciated that the manual application of abrasive segments to a generally cylindrical tool body to produce an interrupted abrasive helicoid such as has been briefly outlined above presents difficulties both in segment location and segment application or affixing, which difficulties are considerably greater than those which arise in connection with the application of such segments to a tool body in a circular row or rows. Whereas numerous assembly jigs for applying segments to tool bodies in circular rows are available, the provision of an assembly jig which will facilitate the application of the segments one by one successively to the surface of a cylindrical body remains yet to be devised. The method of the present invention obviates the need for an assembly jig in the helical placement of the abrasive segments and, accordingly, it contemplates the helical grooving of the cylinder prior to application of the segments and the subsequent setting of the segments onto the continuous helical rib which is formed between adjacent groove convolutions, the segments being positioned on the rib in their proper spaced end-to-end relationship. The helical rib thus establishes a guide for the helical disposition of the abrasive segments in their spaced end-to-end relationship and little attention other than making certain that the segments are centered upon the helical rib need be given to lateral spacing of the segments and a simple spacer device may repeatedly be employed in the usual manner of segment mounting for attaining proper circumferential spacing of the segments on the rib. By selecting a proper segment length and proper segment spacing, any desired pattern of segments on the surface of the cylindrical body may be attained. According to the present invention, segment width is made substantially equal to rib width although, if desired, they may be made slightly wider so that there is a small amount of segment overhang on each side of the rib. By such an arrangement wherein the segments are positioned on the helical rib, the segments are exposed for abrasive action at all times and remain so until such time as they have been worn to completion.

The invention further comtemplates a novel means for flushing sludge from the working area of the grinding tool during operation of the latter and, accordingly, the tool body is of hollow construction and is formed with a series of radial ports in the relatively thick wall thereof. These ports establish communication between the interior of the hollow tool body and the spaces which exist between the opposed or adjacent ends of adjacent circumferentially spaced segments in the helical row thereof. Such a means is considerably more effective than is the conventional practice of directing a stream or spray of liquid coolant against a grinding or cutting tool or of directing such a stream or spray onto the working area of the tool at a region slightly in advance of the progressively moving tool.

The provision of a grinding tool such as has been briefly outlined above and possessing the stated advantages constitutes the principal object of the invention and numerous other objects and advantages thereof will readily suggest themselves as the following description ensues.

In the accompanying two sheets of drawings forming a part of this specification, one illustrative embodiment of the invention is shown.

In these drawings:

FIG. 1 is an exploded perspective view of a grinding tool constructed according to the present invention;

FIG. 2 is a side elevational view of the tool body;

FIG. 3 is a sectional view taken substantially along the line 3—3 of FIG. 2;

Figure 4:
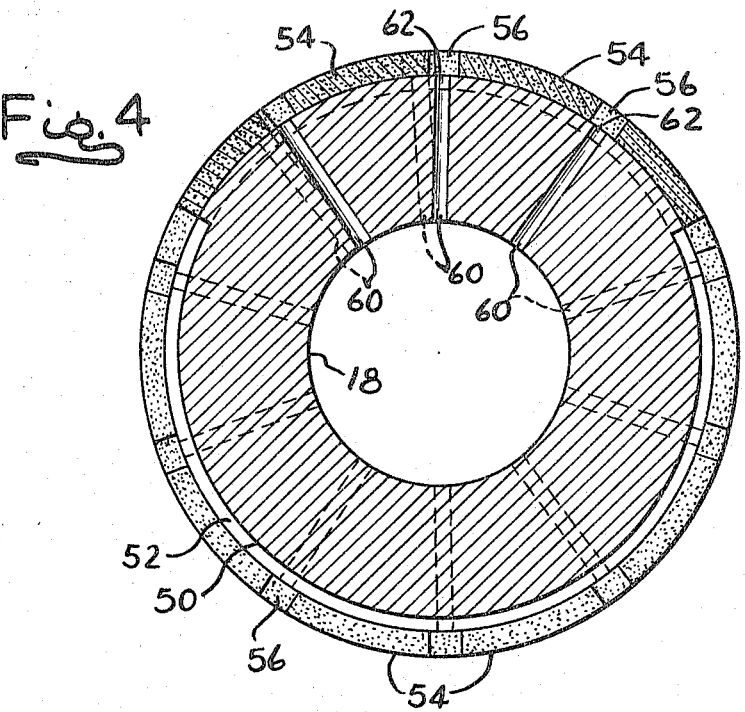
FIG. 4 is an enlarged sectional view taken substantially along the line 4—4 of FIG. 2.

Referring now to the drawings in detail and in particular to FIG. 1, the grinding tool of the present invention is designated in its entirety by the reference numeral 10 and it is comprised of three principal parts, namely, a tool body 12, and a pair of end supports 14 and 16. The tool body 12 is in the form of a relatively thick-walled, open-ended, generally cylindrical tubular member having a relatively large central bore 18 extending axially therethrough and, in addition, annular end faces 20 and 22. The end support 16 is in the form of a circular closure plate 24 which is releasably clamped against the annular end face 22 by means of an annular series of bolts 26 which extend through holes 28 in the plate 24 and are threadably received in threaded sockets 30 in the adjacent end of the body 12. A trunnion-like spindle 32 extends centrally and axially from the closure plate 24. The end support 14 is similar to the end support 16 and includes a circular closure plate 34 which is releasably clamped against the end face 20 by an annular series of bolts 36. The latter extends through holes 38 in the closure plate 34 and are received in threaded sockets 40 in the adjacent end of the tool body 12. A trunnion-like spindle 42 is formed centrally on the closure plate 34 and projects axially therefrom. The spindle 42 is hollow and has formed therein an internal axial passage 41 which communicates with the bore 18 in the tool body 12. A radial passage 44 in the spindle 42 communicates with the axial passage 41.

The two trunnion-like spindles 32 and 42 are adapted to be rotatably supported in a grinding head (not shown) in associated relation with a grinding machine and either of the spindles is adapted to be power driven in order that rotary motion is applied to the tool body 12 in connection with use of the tool 10. A liquid coolant such, for example as water, is adapted to be supplied to the interior of the tool body 12 through the passage 44 in the spindle 42 by means of a suitable adapter connection (not shown) which encompasses the area of the spindle 42 in the vicinity of the passage 44.

Referring now to FIGS. 2 and 3, the generally cylindrical outer surface of the tubular tool body 12 has formed therein a continuous helical groove 50, such groove extending from the end face 20 of the body to the end face 22. The groove is of relative short pitch and adjacent groove convolutions establish therebetween a continuous outwardly extending helical rib 52 which likewise extends from one end face of the tool body to the other end face. The specific nature of the groove 50 and the rib 52 is not critical within certain limits that will be set forth presently. For exemplary purposes groove depth and groove width, as well as rib height and rib width are all illustrated herein as being approximately equal. On this basis, a groove width on the order of one-eighth of an inch for a tool body having an overall diameter of five inches has been found to give excellent results when the tool is in operation.

Figure 5:
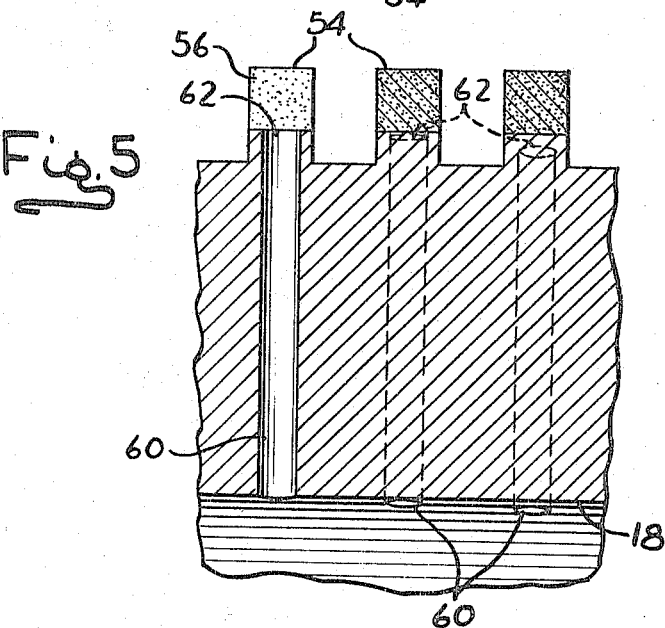
FIG. 5 is a sectional view taken substantially along the line 5—5 of FIG. 4.

As best seen in FIGS. 4 and 5, a helical series of elongated abrasive segments 54 is positioned upon and bonded to the continuous helical rib 52 in end-to-end slightly spaced relationship and in a generally circumferential direction. Each segment 54 is in the form of a metallic matrix throughout which there is uniformly distributed a quantity of crushed or fragmented diamonds. The segments are of elongated substantially rectilinear block-like design and in the illustrated form they are substantially square in transverse cross section. Where the overall diameter of the tool body 12 is relatively small, the elongated segments 54 may be of arcuate configuration so that the inner faces thereof will fit flush against the rib 52 as shown in FIG. 4. However, where the diameter of the tool body is relatively large, for example, in excess of eighteen inches, it is not essential that the segments be arcuate and the planar inner faces thereof will then seat against the rib 52 in tangential fashion while the soldering or brazing materials that are employed for the bonding operation may be relied upon to fill the small clearances which are established by reason of the tangency of the segments. As shown in FIG. 5, the width of the segments is equal to the width of the rib 52 while the height of the segments, i.e., their radial dimension with respect to the tool body, is slightly greater than the depth of the groove 50 although these dimensions may vary within appreciable limits. The distance between the adjacent or opposed ends of adjacent circumferentially spaced segments is preferably, but not necessarily, equal to the width of a segment so that relatively small gaps or voids 56 are provided between the adjacent end faces of the segments.

The continuous helical groove 50 is formed in the tool body 12 by a square-cut machining operation and thus the rib 52 which is formed by reason of the groove 50 is generally square in transverse cross section and it is truly helical so that it constitutes a guide for placement thereon of the series of segments 54 in an accurately helical row. The abrasive segments 54 are applied to the tool body successively and one at a time, starting with the application of the first segment near one end of the helical rib 52 and adjacent either end face 20 or 22 of the tool body. By selecting the proper segment length and segment spacing, it is obvious that any desired segment pattern may be created on the outer surface of the tool body. If the length of one helix convolution as measured on the surface of the rib 52 is a multiple of the combined length of one segment 54 and one gap 56, then a pattern of longitudinally extending rows of segments will be present upon the surface of the tool body 12. If the combined length of a segment and a gap is not a multiple of the length of one helix convolution, then the various gaps will fall in helical rows such as are shown in FIGS. 1 and 2, the direction of helix wind depending upon a shortage or excess of length with respect to a multiple when the distances are laid out upon the rib 52. The pitch of the helix also will depend upon the combined length of one segment and one gap 56.

In order effectively to apply a liquid coolant to the working area of the grinding tool 10 when the tool is in operation, radial coolant passages 60 are drilled through the wall of the tool body 12 and lead from the central bore 18 to the gaps 56 which exist between the adjacent ends of the segments 54. These passages terminate at their outer ends in small jet-producing ports 62 on the outer surface of the rib 52. When the grinding tool 10 is in operation upon the surface of a slab or other workpiece, the liquid coolant which is introduced under pressure through the radial passage 44 and the longitudinal passage 41 in the trunnion-like spindle 42 enters the central bore 18 in the tool body 12 and then flows radially outwardly through the passages 60 from whence it issues from the ports 62 in the form of fluid jets for sweeping or flushing away any sludge which may have been created as a result of the abrasive action of the segments 54 on the surface of the work.

The abrasive tool 10 may be effectively operated regardless of which direction of rotation is restored to. Where the tool is of appreciable length as in the illustrated embodiment thereof, it is contemplated that the direction of relative traverse of the work undergoing surfacing shall be fore-and-aft as distinguished from endwise or axially. However, and particularly where the tool is relatively narrow as, for example, of a width approximating that of a conventional grinding wheel, endwise traversing of the work by the tool may be resorted to, in which case means will be provided for indexing the wheel forwardly or rearwardly at the termination of each pass across the surface of the work. Irrespective, however, of the particular manner in which the tool is caused to traverse the work undergoing surfacing, the essential features of the invention remain undisturbed.

It is to be noted that because of the exposed condition of the various segments 54 on the outer surface of the helical rib 52, the tool may be operated until all of the segments have been worn to completion, after which the tool body may be discarded or another set of segments applied to its external rib. It is to be further noted that, because of the relatively small pitch of the helical rib 52, successive segments along the helical row are only slightly and progressively offset from each other in the axial direction of the tool body so that a given point on an area undergoing surfacing will be traversed by several successive segments in the same helix convolution before such convolution shifts laterally away from such point. This is exemplified in FIG. 4 wherein it is apparent that a transverse plane passing through the wheel body 12 will intersect as many as five segments in the same helix convolution.

The invention is not to be limited to the exact arrangement of parts shown in the accompanying drawings or described in this specification as various changes in the details of construction may be resorted to without departing from the spirit or scope of the invention. Therefore, only insofar as the invention has particularly been pointed out in the accompanying claim is the same to be limited.

Having thus described the invention what I claim as new and desire to secure by Letters Patent is:

A rotary grinding tool of the character described and comprising a generally cylindrical tool body the outer surface of which is provided therein with a continuous helical groove defining a square cut upstanding helical rib which extends from one end of the tool body to the other, and a helical series of elongated abrasive segments mounted upon and bonded to the outer surface of said rib in spaced end-to-end relationship and likewise extending from one end of the tool body to the other end, said abrasive segments being rectangular in transverse cross section, having a transverse width equal to the width of the rib to which they are bonded, and being equally spaced in the direction of the helix path, each abrasive segment consisting of a metallic matrix having fragmented diamonds distributed throughout the same, the pitch of said helix path being sufficiently short that a transverse plane extending through the tool body will intersect at least three adjacent segments in the same helix convolution, and said tool body being provided with an open-ended axial bore therethrough, there being a series of radial liquid coolant passages in the wall of said tool body establishing communication between the axial bore and the gaps which exist between adjacent opposed ends of the segments.

References Cited

UNITED STATES PATENTS

| | | | |
|---|---|---|---|
| 1,029,406 | 6/1912 | Staynes | 51—206 |
| 2,769,286 | 11/1956 | Beth | 51—206.4 |
| 3,146,561 | 9/1964 | Lindblad | 51—206.4 |

FOREIGN PATENTS

| | | |
|---|---|---|
| 120,800 | 11/1918 | Great Britain. |

ROBERT C. RIORDON, *Primary Examiner.*

D. G. KELLY, *Assistant Examiner.*